3,236,673
COLLOIDAL SILICON CARBIDE AND THE
METHOD OF MAKING THE SAME
Thomas L. O'Connor, Dedham, and Wayne A. McRae, Lexington, Mass., assignors, by mesne assignments, to Ionics, Inc., Cambridge, Mass.
No Drawing. Filed June 3, 1963, Ser. No. 284,836
8 Claims. (Cl. 106—288)

This application is a continuation-in-part of application Serial Number 844,193, filed October 5, 1959, now abandoned.

This invention relates to white colloidal silicon carbide and to the method of making the same. More particularly, a material containing silicon is reacted with a source of pure carbon under proper conditions and controls to produce silicon carbide of a controlled average particle size (100 to 1000 millimicrons) and purity which, when suspended in a proper vehicle, produces a substantially pure white hiding paint.

It is well known that pigment hiding power (i.e., ability to hide a given surface with a minimum amount of pigment suspended in a vehicle) is principally dependent upon the pigment having a high index of refraction and a colloidal particle size. Silicon carbide has the requisite high index of refraction (2.63) comparable to the two principal white titanium dioxide pigments, anatase and rutile. However, heretofore it has not been possible to prepare pure white silicon carbide in the desired colloidal particle size to render it satisfactory as a white pigment. The usual silicon carbide of commerce is not of colloidal size and is too dark in color to be satisfactory for this purpose.

Previous references to the use of silicon carbide as a paint or varnish additive do not suggest its use as a prime white hiding pigment but rather show its use in improving the wear and chip resistance of paint or varnish films taking advantage of the hardness of the material. The prior art relating to the preparation of silicon carbides does not suggest practical and inexpensive means of preparation nor does it suggest methods of controlling the particle size necessary to the preparation of an efficient pigment.

For example, it has been proposed to incorporate a rather large particle size pulverized silicon carbide, for instance, Carborundum or quartz-meal into varnish for the purpose of effecting a highly chip resistant coating material for preventing flake off, shock, splitting when struck or dropped, etc. The average diameter of such pulverized silicon carbide is noted to have been 40–100 microns (U.S. Patent No. 1,950,820, 1934). It will be noted that the silicon carbide is not a hiding pigment in this use with varnish but rather is an additive for increasing the resistance to shocks and blows often inflicted upon varnish coatings.

It has also been proposed to employ granular silicon carbide with a proper vehicle as a paint for the express purpose of providing an extraordinary hard coating with extremely high abrasion resistance. However, the color of such coating materials was never pure white (usually associated with white pigmentary hiding titanium and lead paints) but of various shades of gray without hiding power. This is undoubtedly due to the comparatively large silicon carbide particles employed as the pigment material (greater than 10 microns) (H. Hesse, Scifen v. Anstrichmittel, 55, 723, 1953).

The present invention overcomes the above inadequacies and deficiencies in the preparation and use of colloidal silicon carbide particles as a white hiding pigment. Accordingly, this invention is directed to a pigmentary silicon carbide of a substantially pure white grade, which when mixed or incorporated with a proper vehicle, forms a white paint of extremely high hiding ability. The silicon carbide particles of this invention may be formed colorless, electronically compensated and with an average particle diameter size in the range of 100 to 1000 millimicrons with the particles produced preferably by a high temperature fluidized bed furnace but with other types of furnaces or batch operation processes such as rotary kiln furnaces also useful. A particle size in the range in between about 100 and about 1000 millimicrons is critical. Preferably the range should be between 200 and 500 millimicrons. It is also important that the silicon carbide have the proper electronic configuration in which, for example, minor impurities of the third column of the periodic table are compensated by impurities of the fifth column of the periodic table. A mass of such particles has good hiding power and appears substantially white in color. It has a high index of light refraction and relatively good reflection and is comparable in these respects to titanium dioxide.

Comparative tests measured against a standard of magnesium oxide indicate the applicant's composition is equal to titanium dioxide as a white pigment. Titanium dioxide of high quality reflects upward of 80% of light as compared with magnesium oxide. Experimental quantities of silicon carbide of the type described by the applicants have been found comparable to titanium dioxide, reflecting 80% of the light with no more than a 20% variation over the entire visible spectrum.

The invention also relates to a method of making silicon carbide particles of the type described. Silicon carbide particles cannot be formed in the range of 100 to 1000 millimicrons by abrasive means in view of the unusual hardness of silicon carbide. But it has been discovered in this invention that silicon carbide may be made in such particle sizes with the necessary purity by heating an intimate mixture of pulverized silicon containing material with an excess of carbonaceous material to a temperature of above 1350° C. and below 1750° C. in an inert gas for a predetermined period of time. By properly controlling the particle size of the starting material and other parameters, pigmentary silicon carbide of average particle diameter sizes from 100 to 1000 millimicrons may be produced. The mass which is heated to the range of from 1350° C. to 1750° C. is cooled and the excess carbon is burned off at elevated temperatures to complete the process. As indicated, a preferred method of practicing this invention contemplates using a fluidized bed technique for effecting the reaction. Use of carbon black and silica in the form of quartz is also preferred.

Another object of the present invention is to provide a colloidal silicon carbide particle mass providing high hiding power suitable for inclusion in a coating material such as paint.

A further object of the present invention is to provide a novel form of silicon carbide particles wherein the average particle diameter is within the range of approximately 100 to 1000 millimicrons.

A still further object of the present invention is to provide a novel procedure for making large quantities of pure white silicon carbide particles in colloidal size.

Further objects of the present invention will appear from the following more detailed disclosure of this invention.

As defined herein the white or whiteness of the silicon carbide of this invention is comparable to the white or whiteness of titanium dioxide of high quality. Titanium dioxide in turn has a high index of refraction and relatively good reflection with respect to magnesium oxide which is conventionally used as a relative measurement of whiteness. Titanium dioxide of high quality reflects upwards of 80% of light as compared with magnesium oxide with no more than a 20% variation over the entire visible light spectrum.

In the process of the present invention, a source of silicon, such as quartz, sand, silicic acid, silica gel, colloidal or amorphous silica (silica sol), as well as elemental silicon, etc., is reacted at elevated temperatures with pure carbon. The carbon may be obtained, for example, from methane or other hydrocarbons, petroleum coke, charcoal, etc. The temperature of the reaction is maintained within the range of about 1350° C. to about 1750° C. and preferably between 1400–1600° C. The reaction may be carried out in a vacuum, but it is preferable to use an inert atmosphere of hydrogen, carbon monoxide, argon, helium, etc.

Although in the present disclosure substantially white silicon carbide is produced from the purest starting materials, as a practical matter it is often necessary to use starting materials which have some degree of impurities. Thus for example there may be traces of iron or aluminum in either starting material even though such material is considered commercially pure. Such traces of iron or aluminum impurities even in amounts of one part per million in either starting material will discolor the silicon carbide produced unless material is added to compensate for this impurity. It has been found that such starting materials as quartz, sand, silicic acid, silica gel, colloidal or amorphous silica, silicon and carbon which as indicated often have traces of impurities of the third column of the periodic table may be electronically compensated by impurities of the fifth column of the periodic table and where the impurities are of the fifth column of the periodic table they may be electroniacll compensated by the addition of impurities of the third column of the periodic table. For example, the presence of iron as a contaminant in either of the starting materials imparts a greenish tint to the silicon carbide product, but this green color can be offset by the addition of approximately equivalent atoms of vanadium to the raw materials corresponding to the iron content thereof.

As used herein a material is "colorless" when all wave lengths within the visible spectrum are reflected from the material with a variation of reflection of any given wave length within the visible spectrum not differing by more than substantially 10% from the mean value of reflection. A material may be opaque or gray even though it is colorless depending upon its ability to absorb light. Where a material absorbs 100% of all the light waves in the visible spectrum it will appear black or opaque, and will appear gray with lesser degrees of absorption. In order for the silica carbide particles which are colorless to appear substantially white they must therefore also have a high degree of reflection. For purposes of this specification a reflection of 80% of visible light waves as compared with magnesium oxide with no more than a variation of substantially 20% over the entire visible light spectrum should be considered a high degree of reflection.

As used herein a material is compensated when there is sufficient balance between impurities of a semiconductive nature giving rise to hole and electron conductive conditions, in an otherwise semiconductively pure material so as to make the material appear colorless. Thus for example, silicon carbide having an impurity of $10^{-6}$ Al by atomic weight may be compensated by an impurity of $10^{-6}$ nitrogen by atomic weight.

In order to obtain the critical desired average particle size of silicon carbide of from about 100 to about 1000 millimicrons whereby pure white high grade carbide of excellent hiding power is obtained, the use of a fluidized bed of the type disclosed in now abandoned patent application Serial No. 829,666 filed July 27, 1959, by E. B. Gutoff was found very effective, but the use of conventional fluidized bed, stationary or rotating furnaces would also produce the critical particle size silicon carbide under the proper control of the recited reaction conditions.

It is to be noted that the desired average particle size of the white pigmentary silicon carbide of the present invention is critical in that the range is between about 100 and about 1000 millimicrons and preferably between about 200 to 500 millimicrons. These ranges are not merely a matter of degree or arbitrary choice. They are limitations which are determined by the wave length of light. The most ideal particle size would be in the neighborhood of one-half the wave length of blue light, or approximately 225 millimicrons. Particle sizes smaller than one-half the wave length of light at the lower end of the visible light spectrum have not been found satisfactory, nor will particle sizes greater than the wave length of light work satisfactorily.

The time of reaction of the starting materials if too short results in particle sizes too small, and if the reaction time is too long, the particle sizes of the reaction product are too large. Other variables, such as the particle sizes and character of the starting materials and temperature of the reaction, also affect the product size obtained in a given time period. It has been found that the carbon and silicon containing feed materials should have an average particle size less than about 100 microns. It was found that withdrawing samples at frequent intervals from the reactor and measuring the particle size would very easily and effectively determine the end point of the reaction to produce the critical average particle sizes desired. In practice, this time interval varied from about five minutes to about two hours.

The proportions of starting materials must be such that there is an excess of carbon. The resulting excess after the reaction may then be removed by heating in air or oxygen or other oxygen-containing gas at temperatures of about 900° C. forming volatile carbon dioxide. It has been found that white colloidal silicon carbide may be produced using an excess of carbon of from about 0.1 to about 0.9 mole of excess carbon per mole of silicon in all SiC produced.

The white pigmentary silicon carbide of particle sizes of this invention may then be intimately dispersed in well-known vehicles, such as solutions or dispersions of linseed oil, alkyd resins, latex, etc., to produce the white paint of the present invention.

The following examples illustrate the preferred mode of carrying out the invention and the novel product obtained.

*Example 1*

A 50 percent mixture of pure silicic acid and carbon black having an average particle size of less than 100 microns was placed in a graphite boat and heated to 1400–1575° C. in a mullite combustion tube in a stream of hydrogen. After several sample tests were made to ascertain the average particle size of the granular silicon carbide formed, the reaction was stopped, the tube cooled in an atmosphere of hydrogen to below 1000° C. and the product removed from said tube. The time interval of the reaction was one hour. The sample was then removed from the boat and heated in air to 800–900° C. to burn out unreacted carbon. Unreacted silica was removed by volatilization of $SiF_4$ by treatment with a mixture of hydrofluoric and sulfuric acid. The average size of the material was 500 millimicrons and was pure white. The tinting strength of this material was 90 percent of a commercial anatase titanium dioxide according to A.S.T.M. standard test designation, D332-36. (A.S.T.M. Standards, 1946, Part II, pub. by American Society for Testing Materials, Phila., Pa.)

*Example 2*

Five hundred grams of pure quartz —325 mesh was placed in a 2-inch diameter fluidized bed reactor in a stream of methane gas. The fluidized bed reactor constituted approximately the lower third of a vertical shaft furnace. The middle third of the furnace was a discharging zone for the fluidized bed while the upper third was a combustion zone for supplying heat to the fluidized bed. The mixture was heated to 1450° C. and it was found from tests of extracted samples that thirty minutes were sufficient to produce the predetermined sized silicon carbide particles. The reaction is endothermic and required a stream of methane passing through the windbox of the reactor at a velocity of 30–100 feet per minute, whereby the cracking of the methane in the fluidized bed produced hydrogen, which upon reaction with oxygen admitted into the upper combustion zone of the furnace, produced the heat in the form of radiant energy necessary for maintaining the reaction in the fluidized bed. The reaction product was cooled in argon to 900° C., then air was blown through to oxidize excess carbon. The silicon carbide discharged from the bed was then pure white. The particle size was 250 millimicrons and the tinting strength, compared to anatase titanium dioxide pigment, was 125 percent.

In similar reactions in which the solid feed had an average particle size greater than 100 microns, and in which the temperature was outside the range of 1350 to 1750° C., or in which the carbon excess was outside the range of 0.1 to 0.9 mole of excess carbon fed per mole of silicon fed, white prime hiding colloidal silicon carbide pigment was not obtained.

Having described our invention, we claim:

1. Silicon carbide particles characterized by having an average particle diameter size in the range of between 100 to about 1000 millimicrons and by having minor impurities selected from the group consisting of elements of the third and fifth column of the Periodic Table, said impurity elements of one of said columns compensated by elements of said other column, said particles further characterized by reflecting upward of 80% of light as compared with magnesium oxide with no more than a 20% variation over the entire visible spectrum.

2. The particles of claim 1 wherein the third column impurity is aluminum and the fifth column impurity is nitrogen.

3. The particles of claim 1 wherein the fifth column impurity is nitrogen.

4. The particles of claim 1 wherein the average particle diameter size is in the range of between 200–500 millimicrons.

5. Silicon carbide particles of substantially controlled particle size characterized by having an average particle diameter size in the range of between about 100 to 1000 millimicrons, and by having minor impurities of iron compensated by impurities of vanadium, said particles further characterized by reflecting upward of 80% of light as compared with magnesium oxide with no more than a 20% variation over the entire visible spectrum.

6. A process for making silicon carbide particles of substantially controlled particle size having an average particle diameter size in the range of about 100 to 1000 millimicrons which comprises reacting a source of silicon selected from the group consisting of quartz, sand, silicic acid, silica gel, colloidal silica, amorphous silica and elemental silicon with an excess of carbon at a temperature in the range of about 1350 to about 1750 degrees centigrade in an atmosphere selected from the group consisting of hydrogen, carbon monoxide, argon and helium which silicon source, carbon and atmosphere containing minor impurities selected from the group consisting of elements of the third and fifth column of the Periodic Table, said impurity elements of one of said columns being compensated by addition of elements of said other column thereby producing particles characterized by reflecting upward of 80% of light as compared with magnesium oxide with no more than a 20% variation over the entire visible spectrum.

7. The process of claim 6 wherein the source of silicon is quartz and the temperature of the reaction is in the range of about 1,400 to about 1,600 degrees centigrade.

8. The process of claim 6 wherein the source of silicon is silicic acid and wherein the carbon is carbon black.

References Cited by the Examiner

UNITED STATES PATENTS

| | | | |
|---|---|---|---|
| 1,280,067 | 9/1918 | Mohney | 106—261 |
| 1,424,414 | 8/1922 | Lamb | 106—261 |
| 1,951,133 | 3/1934 | De Bats | 23—208 |
| 2,178,773 | 11/1939 | Benner et al. | 23—208 |
| 2,686,819 | 8/1954 | Johnson | 23—208 X |
| 2,854,364 | 9/1958 | Lely | 23—208 X |
| 3,044,858 | 7/1962 | Sage | 23—204 X |
| 3,077,385 | 2/1963 | Robb | 23—208 |
| 3,085,863 | 4/1963 | Prener | 23—208 |

FOREIGN PATENTS 459,257   1/1937   Great Britain.

OTHER REFERENCES

Baumann, Journal of the Electrochemical Society, vol. 99, No. 3, March 1952, pp. 109–114.

Hackh's Chemical Dictionary, 3rd Ed., p. 213.

MAURICE A. BRINDISI, *Primary Examiner.*